(12) United States Patent
Fähnle

(10) Patent No.: US 12,066,094 B2
(45) Date of Patent: Aug. 20, 2024

(54) OIL COOLING CIRCUIT OF AN AUTOMATIC TRANSMISSION

(71) Applicant: Voith Patent GmbH, Heidenheim (DE)

(72) Inventor: Rainer Fähnle, Heubach (DE)

(73) Assignee: Voith Patent GmbH, Heidenheim (DE)

( * ) Notice: Subject to any disclaimer, the term of this patent is extended or adjusted under 35 U.S.C. 154(b) by 519 days.

(21) Appl. No.: 17/198,465

(22) Filed: Mar. 11, 2021

(65) Prior Publication Data
US 2021/0199189 A1    Jul. 1, 2021

Related U.S. Application Data

(63) Continuation of application No. PCT/EP2019/073673, filed on Sep. 5, 2019.

(30) Foreign Application Priority Data

Sep. 13, 2018    (GB) .......................... 102018122333.1

(51) Int. Cl.
*F16H 57/04* (2010.01)
*B60T 1/08* (2006.01)
(Continued)

(52) U.S. Cl.
CPC ............ *F16H 57/0413* (2013.01); *B60T 1/08* (2013.01); *B60T 10/02* (2013.01); *F16D 57/04* (2013.01);
(Continued)

(58) Field of Classification Search
CPC ............ F16H 57/0413; F16H 57/0412; F16H 2061/0037; F16H 2057/0204; B60T 10/02; B60T 1/08; B60T 5/00
(Continued)

(56) References Cited

U.S. PATENT DOCUMENTS 4,627,397 A * 12/1986 Hayashi .................. F01P 7/165
                                                       123/41.27
6,427,640 B1 * 8/2002 Hickey ............... F16H 57/0412
                                                       123/41.31
(Continued)

FOREIGN PATENT DOCUMENTS

DE         34 30 456 A1    10/1985
DE         199 02 408 A1    8/2000
(Continued)

OTHER PUBLICATIONS

DE-102015218345-A1 Wurster English Translation and Original Document retrieved from Espacenet Jul. 2023, published 2017 (Year: 2017).*

(Continued)

*Primary Examiner* — Paul N Dickson
*Assistant Examiner* — Caitlin Anne Miller
(74) *Attorney, Agent, or Firm* — Taylor IP, P.C.

(57) ABSTRACT

An oil supply system for an automatic transmission or for an automated manual transmission in a drive train. The oil supply system includes an oil sump and a heat exchanger, wherein the oil supply is provided for at least the following operating states of the automatic transmission:
  a converter mode;
  a drive mode in one of the mechanical gears; and
  a retarder mode.
To optimize cooling of the oil volume flows in the different operating states two heat exchangers are provided, through which an oil volume flow can be conducted depending on the operating state of the transmission.

8 Claims, 2 Drawing Sheets

(51) Int. Cl.
*B60T 10/02* (2006.01)
*F16D 57/04* (2006.01)
*F16D 65/78* (2006.01)
*F16H 61/00* (2006.01)

(52) U.S. Cl.
CPC ......... *F16D 65/78* (2013.01); *F16H 57/0417* (2013.01); *F16H 61/0021* (2013.01); *F16D 2065/782* (2013.01); *F16H 2061/0037* (2013.01)

(58) Field of Classification Search
USPC .......................................................... 180/339
See application file for complete search history.

(56) References Cited

U.S. PATENT DOCUMENTS

| | | | | |
|---|---|---|---|---|
| 10,234,016 | B2* | 3/2019 | Shiina | ................ F16H 57/0417 |
| 2002/0112679 | A1* | 8/2002 | Langervik | ................ F01P 3/20 |
| | | | | 123/196 AB |
| 2006/0060345 | A1 | 3/2006 | Flik et al. | |
| 2011/0203668 | A1 | 8/2011 | Hofig et al. | |

FOREIGN PATENT DOCUMENTS

| | | | |
|---|---|---|---|
| DE | 101 38 704 A1 | 3/2003 | |
| DE | 10301314 A1 * | 7/2004 | .............. F01P 11/08 |
| DE | 10 2015 218 352 A1 | 3/2017 | |
| DE | 10 2015 218 358 A1 | 3/2017 | |
| DE | 102015218345 A1 * | 3/2017 | |
| EP | 2326812 B1 * | 5/2016 | ................ F01P 3/20 |

OTHER PUBLICATIONS

DE 19902408 Gierling English Translation and Original Document retrieved Jul. 2023 published in 2000 (Year: 2000).*
DE 10138704 A1 ALtvater English Translation and Original Document retrieved Jul. 2023 published in 2003 (Year: 2003).*
Notification of the Transmission of the International Search Report and Written Opinion of the International Search Authority or Declaration dated Nov. 26, 2019 for International Application No. PCT/EP2019/073673 (11 pages).
1 German Office Action dated Oct. 23, 2023 for German Patent Application No. 10 2018 122 333.1 (10 pages).

* cited by examiner

OIL COOLING CIRCUIT OF AN AUTOMATIC TRANSMISSION

CROSS REFERENCE TO RELATED APPLICATIONS

This is a continuation of PCT application No. PCT/EP2019/073673, entitled "OIL COOLING CIRCUIT OF AN AUTOMATIC TRANSMISSION", filed Sep. 5, 2019, which is incorporated herein by reference.

BACKGROUND OF THE INVENTION

1. Field of the Invention

The current invention relates to an oil cooling circuit of an automatic transmission or of an automated manual transmission in a drive train.

2. Description of the Related Art

Oil supply systems for automatic transmissions or automated manual transmissions traditionally have an oil pump which is driven by an internal combustion engine. The oil pump delivers oil from an oil sump into an oil supply line network to supply oil to elements of the transmission. The various elements represented in an automatic transmission or in automated manual transmissions include clutches, brakes, a converter, a hydrodynamic brake (retarder) as well as the lubrication points in a transmission.

During operation of the vehicle, the various elements require very different oil volumes at very different oil pressures at different points in time. For safe and trouble-free operation of an automatic transmission or an automated manual transmission it is important, inter alia, that the oil temperature remains within defined limits.

An oil supply system is known from DE 10 2015 218 358 A1, wherein a temperature sensor is provided after the pump device for monitoring of the oil temperature in the pressure line. By the positioning of the temperature sensor in this manner, critical temperatures in the pressure line can, in particular, be detected. To further improve operational reliability, the temperature sensor can, viewed in direction of flow, be positioned after the hydrodynamic converter.

Furthermore, it is known to additionally measure the oil sump temperature. Monitoring of the oil temperature in the transmission thus requires 2 temperature sensors.

What is needed in the art is a method and apparatus that allows the monitoring of oil temperatures without requiring two temperature sensors.

SUMMARY OF THE INVENTION

The present invention relates to an oil supply system for an automatic transmission or an automated manual transmission that enables optimized cooling of the oil volume flows under different operating conditions.

An oil supply system for an automatic transmission or for an automated manual transmission in a drive train is proposed, which includes an oil sump and a heat exchanger, wherein the oil supply is provided for at least the following operating states of the automatic transmission:
 converter mode;
 drive mode in one of the mechanical gears;
 retarder mode.

To optimize cooling of the oil volume flows in different operating states it is proposed according to the present invention that two heat exchangers are provided, through which an oil volume flow can be conducted depending on the operating state of the automatic transmission. When two heat exchangers are used they can be adapted respectively to the conditions of the operating states, so that cooling of the corresponding oil volume flows is improved.

In one embodiment of the present invention, a measuring device for measuring an oil circuit temperature is provided, by means of which the temperature of the oil volume flow can be measured in all operating states. Thus, the most critical temperature can always be monitored in each operating state, and the function of the transmission can be ensured without the risk of overheating the oil.

In the event of oil potentially overheating, regulating strategies are provided in order to maintain the temperature of the oil volume flow for a given operating state at a desired level or to regulate same. The temperature of the oil volume flow through the converter is measured in the converter mode, the temperature of the oil volume flow through the retarder is measured in the retarder mode, and the oil sump temperature is measured in the drive mode, where one of the mechanical gears is in operation.

One preferred embodiment provides for use of both heat exchangers in the converter mode and the drive mode. For the retarder mode use of only the second heat exchanger is provided.

The measuring device is a sensor by which the temperature of the oil volume flow flowing into the second heat exchanger is measured. When using a 2-flow heat exchanger, in which the flow connections into the two heat exchanger channels for the oil volume flows are positioned closely to one another, a certain heat transfer occurs to the flow connection of the second heat exchanger when the temperature of the oil flow into the first heat exchanger rises sharply, such that a temperature rise is detected through the heat transfer.

By positioning the temperature sensor before the heat exchanger inlet of the second heat exchanger, different temperatures can be measured depending on the operating state of the transmission, because an oil volume flow is directed through the second heat exchanger in all operating states. A second temperature sensor can therefore be dispensed with.

In a further embodiment variant, the heat exchangers can be designed for different oil volume flows. In the case of a 2-flow heat exchanger, for example, the channels through the heat exchanger are designed differently, Thus, the oil volume flows through the first heat exchanger and through the second heat exchanger can preferably be designed in a ratio of 1:2. Other ratios are also conceivable that are in a range of 1:1.25 to 1:3.

Moreover, valves are provided in the oil cooling circuit by which the oil volume flows are controlled. These can in particular be the valves to control the converter and the retarder.

A pressure control vale for regulating the oil volume flow through the converter can thus be provided, wherein the pressure control valve is provided between the converter and the first and second heat exchanger.

Moreover, a first switching valve and a second switching valve are provided, so that in the braking mode of the retarder, the oil volume flow can be directed through the second heat exchanger in order to dissipate the brake energy.

The first switching valve is switched in such a way that, in drive mode, in one of the mechanical gears of the automatic transmission, the oil volume flow is directed from the oil sump by way of a bypass line through the second heat exchanger and/or through the first heat exchanger.

Additional advantageous characteristics of the invention are discussed below with reference to design examples and the drawings. The specified characteristics can be advantageously implemented in the illustrated combination and can also be combined individually with one another. The drawings illustrate the following details:

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention in one form, and such exemplification is not to be construed as limiting the scope of the invention in any manner.

DETAILED DESCRIPTION OF THE INVENTION

Figure 1:
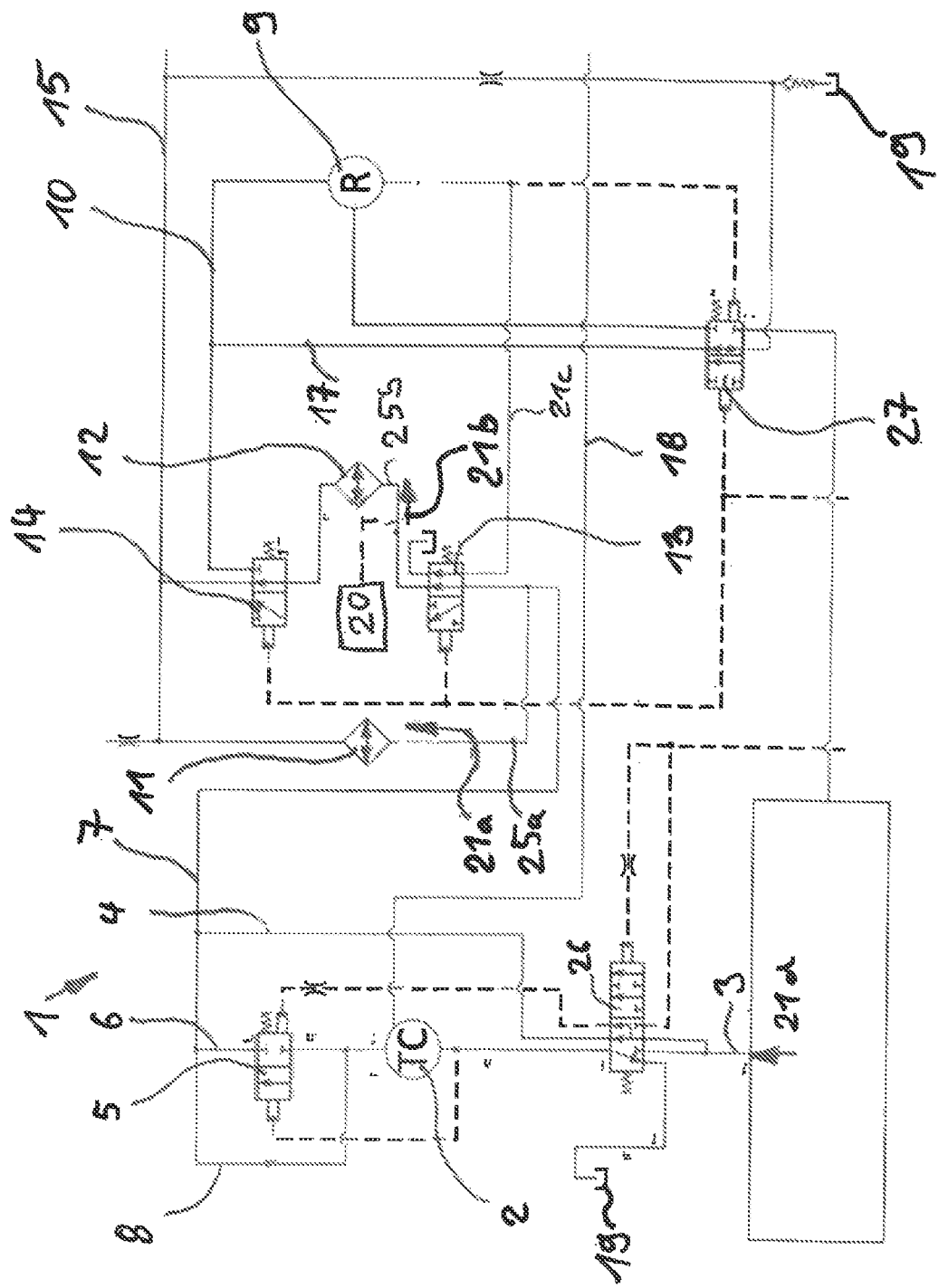
FIG. 1 is a functional diagram, in schematic form, of an embodiment of an oil circuit for an oil supply of the present invention.

Exemplary embodiments provided according to the present invention are illustrated by the drawings and now referring to FIG. 1 there is illustrated a functional diagram of the inventive oil circuit for supplying oil to an automatic transmission. The schematic herein has been reduced to the details relevant to the invention which are necessary for oil cooling. A pump, which is not illustrated, conveys the oil from an oil sump 19 by way of an oil supply line 3 to all relevant components in the transmission, so that the oil supply for at least the following operating states of the automatic transmission is ensured:

a converter mode;
a drive mode in one of the mechanical gears; and
a retarder mode.

These three operating states effect an energy input into the oil which leads to a temperature increase of the oil. When the motor vehicle that contains the present invention starts, the transmission is switched into a travelling mode by operation of a valve 26. For the travelling mode, a control valve 5 is controlled in such a way that at least a partial volume of an oil volume flow 21d, which is conveyed by the pump, is directed through a converter 2.

The function of control valve 5 is to regulate the output control of converter 2, which will not be discussed in further detail herein. The heated oil, in other words an oil volume flow, is conducted by way of a line 6 and a WT (heat exchanger) feed line 7 to heat exchangers 11 and 12.

In the drive mode, in one of the mechanical gears of the automatic transmission, oil volume flow 21d is conducted from oil sump 19 by way of bypass line 4, line 6 and WT (heat exchanger) feed line 7 to heat exchangers 11 and 12.

Different switching operations are now possible here. In the illustrated switching position of first switching valve 13, oil volume flow 21d is conducted, originating from converter 2, through second heat exchanger 12 and first heat exchanger 11. Oil volume flow 21d separates into oil volume flows 21a and 21b.

It is also contemplated that only first switching valve 13 is switched into the second switching position, so that oil volume flow 21d, originating from converter 2 or bypass 4, is conducted by way of a connecting channel 25a, only through first heat exchanger 11. Oil volume flow 21d corresponds to oil volume flow 21a.

In contrast, in the retarder mode, both switching valves 13 and 14 are switched simultaneously, so that only second heat exchanger 12 is used for cooling the oil in retarder operation, in order to dissipate the braking energy. The retarder control is not discussed further in connection with this invention.

Alternatively, it could also be provided that, in a first step, switching valve 14 is switched so that the retarder is filled, and at the latest when the filling process is complete, switching valve 13 is switched, so that the entire oil volume flow 21c is pumped through retarder 9 and is conducted by way of connecting channel 25b through heat exchanger 12.

Figure 2:
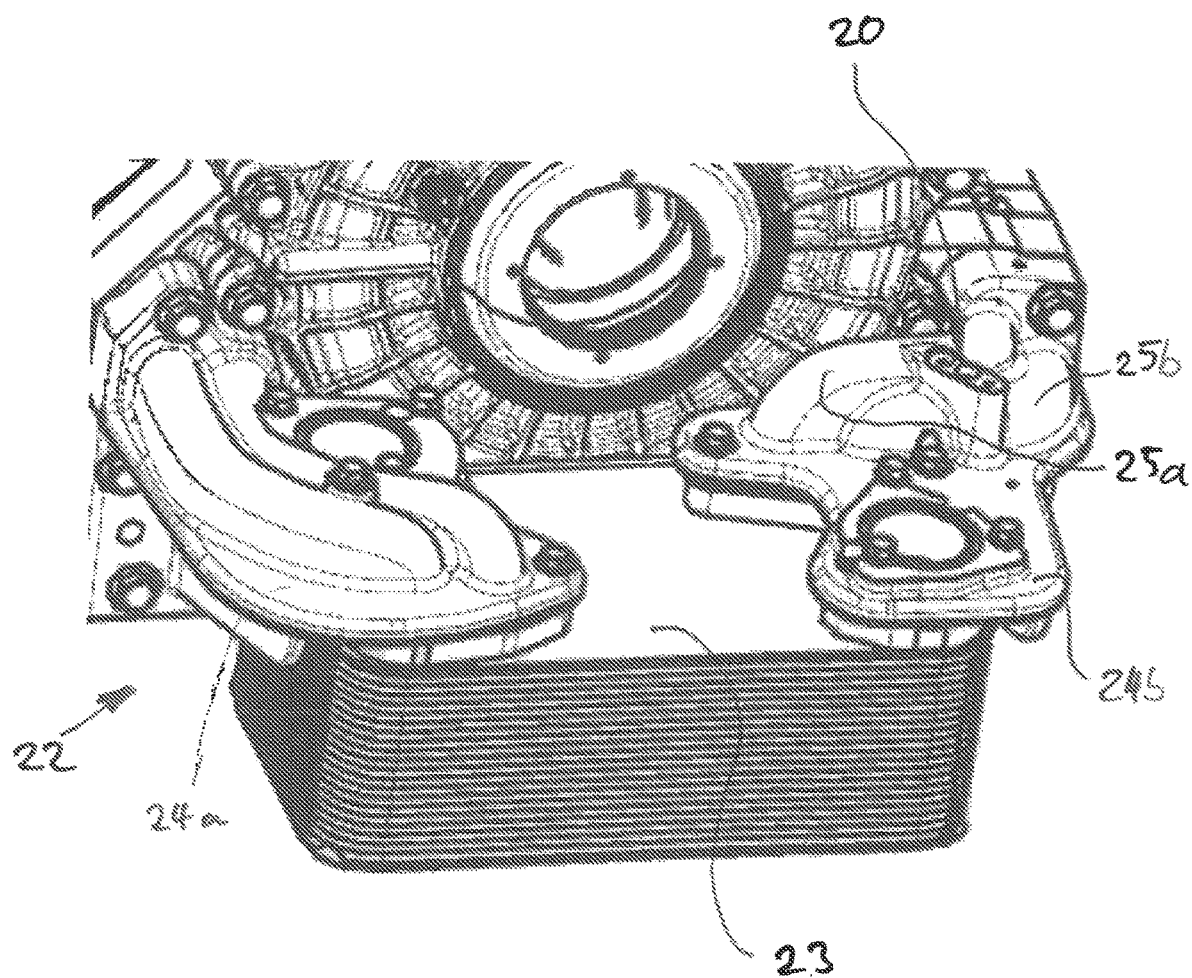
FIG. 2 is a perspective view of a heat exchanger console coupled to the oil circuit of FIG. 1.

Also decisive for the invention is a measuring device 20, the position of which is shown in greater detail in the region of connecting channel 25b in FIG. 2. This is provided for measuring the temperature of oil volume flow 21b. The one sensor of measuring device 20 is arranged on connecting channel 25b. The temperature of oil volume flow 21b into second heat exchanger 12 can thus be measured for all operating states.

Since in all operating states an oil volume flow is conducted by way of connecting channel 25b, the temperature of oil volume flow 21b is measured for all operating states. Critical temperatures can thus be monitored in any operating state. The function of the transmission is thus ensured, and the oil is protected from overheating.

In the event of potential oil overheating, regulating strategies are implemented, by way of which the oil temperature is regulated to definable temperature limits. For example, the reduction in the braking power of the retarder.

The additional illustrated lines and elements of the oil circuit are not further discussed in connection with this invention since they are not relevant to the explanation of the invention. However, they are necessary for the overall functionality of the transmission.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST 1 oil circuit
2 converter
3 oil feed line
4 bypass line
5 valve-converter control
6 line
7 WT (heat exchanger) feed line
8 Leakage flow line
9 retarder
10 feed line
11 heat exchanger 12 heat exchanger
13 switching valve
14 switching valve
15 return line
16 filling line
17 gap filling line
18 return line
19 oil sump
20 measuring device with sensor
21a, b, c, d oil volume flow
22 heat exchanger console
23 heat exchanger
24a,b holder
25 connecting channels
26,27 valves

What is claimed is:

1. An oil supply system for an automatic transmission or for an automated manual transmission in a drive train, the oil supply system comprising:
    an oil sump providing an oil supply;
    a plurality of heat exchangers including a first heat exchanger and a second heat exchanger, at least a portion of the oil supply flowing through the heat exchangers, the oil supply being used for at least the following operating states of the transmission:
        a converter mode;
        a drive mode in one of a plurality of mechanical gears; and
        a retarder mode; and
        wherein oil volume flows through the first and second heat exchangers is conducted depending on the operating state of the transmission; and
    a single temperature sensor configured for measuring an oil circuit temperature of the oil volume flows in all operating states.

2. The oil supply system of claim 1, further comprising a measuring device having a sensor by which a temperature of the oil volume flows flowing into the first and/or the second heat exchanger is measured.

3. The oil supply system of claim 1, wherein the heat exchangers have different oil volume flows.

4. The oil supply system of claim 1, wherein the oil volume flow through the first heat exchanger and the oil volume flow through the second heat exchanger flow at a volume ratio of 1:2.

5. The oil supply system of claim 1, further comprising a plurality of valves controlling the oil volume flows through the first heat exchanger and through the second heat exchanger.

6. The oil supply system of claim 1, further comprising a pressure control valve for regulating of an oil volume flow through a converter, wherein the pressure control valve is provided between the converter and the first and second heat exchangers.

7. The oil supply system of claim 1, further comprising:
a first switching valve; and
a second switching valve, the switching valves in a braking mode of the retarder directs an oil volume flow through the second heat exchanger to dissipate the brake energy.

8. The oil supply system of claim 7, wherein the first switching valve is switched in such a way that, when the transmission is in the drive mode, with a mechanical gear of the transmission engaged, an oil volume flow is directed from the oil sump by way of a bypass line through the second heat exchanger and/or through the first heat exchanger.

* * * * *